United States Patent [19]
Young

[11] Patent Number: 6,011,950
[45] Date of Patent: Jan. 4, 2000

[54] APPARATUS AND METHOD FOR USING FORWARD ERROR CORRECTION SETTING TO ENABLE SIMULTANEOUS USE OF MULTIPLE MODULATION SYSTEMS ON TERRESTRIAL DISTRIBUTION NETWORKS

[75] Inventor: Alan D. Young, New Canaan, Conn.

[73] Assignee: Viacom International, Inc., New York, N.Y.

[21] Appl. No.: 09/252,340

[22] Filed: Feb. 18, 1999

Related U.S. Application Data

[62] Division of application No. 08/893,827, Jul. 11, 1997.

[51] Int. Cl.$^7$ .................. H04J 3/22; H04N 7/10
[52] U.S. Cl. .................. 455/3.2; 455/12.1; 370/535; 348/6
[58] Field of Search .................. 348/423, 6; 455/3.2, 455/12.1, 427; 370/535–538, 542, 543, 545, 540, 316, 323

[56] References Cited

U.S. PATENT DOCUMENTS

| | | | |
|---|---|---|---|
| 4,700,341 | 10/1987 | Huang | 370/535 |
| 5,666,365 | 9/1997 | Kostreski | 370/537 |

OTHER PUBLICATIONS

IRT 1000 Integrated Receiver Transcoder, Installation and Operation Manual, General Instrument, 1996.

*Primary Examiner*—Chi H. Pham
*Assistant Examiner*—Maikhanh Tran
*Attorney, Agent, or Firm*—Pennie & Edmonds LLP

[57] ABSTRACT

An apparatus and method using the forward error correction setting to enable simultaneous use of multiple modulation systems on terrestrial distribution networks including cable television systems is described. The system includes a transcoder having a demultiplexer for demultiplexing a forward-error-correction decoded signal into a main data stream with a bit rate suitable for 64-QAM cable transmission and an auxiliary data stream with a bit rate approximately half that of the main data stream. Two of such auxiliary data streams can be combined to generate an output data stream with a bit rate suitable for 64-QAM cable transmission. The system also includes a satellite transmitter which can adjust its convolution coding rate to either ½ or ¾ for 64-QAM and 256-QAM cable channels respectively.

8 Claims, 4 Drawing Sheets

APPARATUS AND METHOD FOR USING FORWARD ERROR CORRECTION SETTING TO ENABLE SIMULTANEOUS USE OF MULTIPLE MODULATION SYSTEMS ON TERRESTRIAL DISTRIBUTION NETWORKS

This is a division of application Ser. No. 08/893,827 filed Jul. 11, 1997.

BACKGROUND OF THE INVENTION

The present invention relates generally to signal transmission, and more specifically to an apparatus and method for broadcasting digital signals representing audio, video, data, etc. via satellite to multiple cable television systems and other terrestrial distribution systems which have multiple modulation schemes.

Terrestrial distribution systems include cable television systems ("cable system") which distribute cable television programs ("cable programs") to cable subscribers over coaxial cable or fiber-optic cable. They offer multiple television channels in areas where broadcast is difficult to receive, or supplement existing broadcast service by providing additional services such as pay-per-view. A standard analog cable TV system utilizes frequency division multiplex with multiple television channels, each with 6-Mhz bandwidth (hereinafter referred to as 6-Mhz cable slots).

Terrestrial distribution systems including cable systems must soon convert to digital distribution for providing digital video signals to cable subscribers, because of many advantages associated with digital systems, such as error correction, data compression, flexibility, programmability, and increased quality and quantity of service. These advantages are evidenced by the increased popularity of digital services such as direct digital broadcast service (DBS), multipoint multichannel distribution service (MMDS), etc.

Digital cable systems use a modulation scheme called quadrature amplitude modulation (QAM) to send signals over cable. QAM is a modulation method using both phase and amplitude modulation of a carrier in order to represent a number of information signals. For example, 64-QAM refers to the use of 64 different combinations of phase and amplitude to represent 64 different states of a symbol, or 6 bits ($2^6$=64) of data per symbol.

Current digital cable systems support 64 QAM over the existing 6-Mhz cable slot. This enables approximately 27 megabits per second (Mbps) of data per channel to be transmitted down the cable to the subscriber's home per 6-Mhz cable slot. For this reason, most suppliers of prepackaged digital satellite programming have configured their satellite transponders, each typically having a bandwidth of 36 or 27 Mhz, to deliver 27 Mbps per transponder.

Cable operators originate some cable programs, but they are mainly distributors of prepackaged cable programs received from cable program suppliers. Such cable programs are transmitted from the cable program supplier to the cable operator through a point-to-multipoint link such as a satellite link.

Communication satellites have been used for many years to transmit and distribute such cable programs to cable systems over larger geographical areas. The transmission paths from ground to satellite and back to ground are called an uplink and a downlink respectively. The carrier frequencies for uplink and downlink are usually different to avoid interference between the two. For example, in the C band used for satellite communication, the uplink frequency is in the 6 Ghz range and the down-link frequency is in the 4 Ghz range.

FIG. 1 shows a prior art digital cable system using satellite transmission to deliver the programming to the cable headend. In order to correct errors during transmission to and from the satellite, a transmitting earth station has a satellite transmitter 1 which encodes digital information signal 2 containing cable programs using a forward error correction (FEC) scheme. FEC refers to an error correction scheme using a redundant code based upon which errors can be detected and corrected without requesting a retransmission from the transmitter. FEC contrasts with automatic repeat request (ARQ), which enables error detection but not correction, where the receiver alerts the transmitter when errors occur so that the data can be retransmitted. FEC, in contrast, corrects errors at the receiving end without having to retransmit the data. Several FEC codes are well-known in the art, including block codes such as Hamming codes or Reed Solomon codes, and non-block codes such as convolutional codes. FEC is particularly suitable for transmission via satellite because it is generally impractical or impossible to request a retransmission of corrupted data.

A satellite-FEC encoder 3 converts the information signal to an FEC-encoded signal 4. A typical satellite-FEC encoder incorporates two levels ("shells") of error correction: a Reed Solomon outer shell for correcting byte errors and a convolution encoder inner shell for bit error correction.

The satellite transmitter in the earth station also includes a satellite modulator 5 to modulate the FEC-encoded signal 4, containing the cable programs, into a satellite signal 6. The signal 6 is sent to satellite 9 via antenna 7, producing uplink signal 8 in the form of a narrow beam at the uplink frequency.

Typically, a digital satellite signal is quaternary phase-shift key (QPSK) modulated. Unlike cable systems using QAM, which varies both carrier phase and amplitude, the satellite system typically uses phase-shift keying (PSK), varying only the phase of the carrier, because satellite systems are highly subject to amplitude fluctuations due to noise in the atmospheric channel. QPSK is a particular PSK modulation scheme which assigns two bits to a symbol having four ($2^2$) possible phase states corresponding to 0, 90, 180, and 270 degrees. Thus, QPSK carries two bits per symbol.

The satellite 9 has a transponder 10 which receives the uplink signal 8 from the transmitting earth station, and amplifies and translates it into a downlink frequency for retransmission to a receiving earth station via downlink signal 11. A typical satellite currently used for this purpose may have 24 transponders, each supporting a bandwidth of approximately 27 or 36 Mhz.

A receiving earth station receives the downlink signal 11 through a receiving antenna 12 to generate a signal 13 which is QPSK modulated. The receiving earth station has a transcoder 14 which converts, or remodulates, the QPSK-modulated satellite signal 13 to a QAM-modulated signal for cable transmission. The transcoder is also known in the art as an integrated receiver transcoder (IRT). The prior art transcoder 14 includes a satellite demodulator 15 for demodulating the received satellite signal. A satellite-FEC decoder 17 decodes the resulting demodulated signal 16 by removing the redundant FEC codes (added for satellite transmission) to produce information signal 18. Similar to the satellite-FEC encoder 3, a typical satellite-FEC decoder incorporates two levels or shells of error correction: a Reed Solomon decoder outer shell for correcting byte errors and a convolution decoder inner shell for bit errors. A Viterbi decoder may also be used, which is a special kind of convolutional decoder known in the art.

In digital cable systems, the information signal 18 containing cable programs is then encoded using a forward error correction (FEC) scheme before it is modulated for transmission over cable.

For this purpose, a cable-FEC encoder 19 encodes the received information signal 18 to an encoded signal 20. Prior to the FEC-encoding, the signal may be encrypted to prevent unauthorized access (not shown).

A 64-QAM cable modulator 21 then modulates the encoded signal 20 to a cable signal 22 for 64-QAM transmission. For more details on the IRT, see General Instrument's "IRT 1000 Integrated Receiver Transcoder, Installation and Operation Manual," 1996.

As mentioned before, current digital cable systems generally support 64 QAM over the existing 6-Mhz cable channel. However, recent advances in technology enable the use of 256 QAM for cable transmission and distribution, allowing an increased data rate of approximately 38.8 Mbps (contrasted with the current 27 Mbps) per channel through the existing 6-Mhz cable channel to the subscriber's home. Satellite transponders will thus need to be configured to deliver 38.8 Mbps per channel for 256-QAM cable transmission instead of 27 Mbps per channel for the previously used 64-QAM transmission in order to maximize the use of cable bandwidth.

This means, importantly, that cable operators and cable program suppliers must upgrade their equipment from 64 QAM to 256 QAM, at significant expense. Inevitably, some cable operators will find it impractical to upgrade their equipment at the precise instant when cable program suppliers start broadcasting to 256-QAM cable equipment. Indeed, it is wholly impractical to think that in this industry all concerned can agree upon a single instant when all programming will shift from that feeding 64-QAM to that required for 256-QAM distribution. An alternative is to duplicate the satellite channel by doubling the transponder capacity and related equipment, one for 64-QAM and the other for 256-QAM. However, this requires adding another expensive FEC encoder for each channel in the transmitter end. Thus it would be highly desirable to provide transmitting equipment capable of supporting both 64 QAM and 256 QAM simultaneously, thus permitting cable operators who have not upgraded to receive for 64-QAM and those that have upgraded to receive for 256-QAM.

When the cable program suppliers convert their transmission to the 256-QAM format, those cable operators still without the upgraded equipment will need to convert the received signals in the 64-QAM format. Since the 256-QAM format has a higher bit rate, it does not match with the 64 format having a lower bit-rate. The mismatch creates an excess data stream to be processed. Prior art transcoders are incapable of accommodating such a need. They do not have facility to siphon off the excess data stream, and thus generate a single data stream supporting only a single QAM format.

Therefore, there exists a need for apparatus capable of supporting the use of two QAM formats simultaneously.

SUMMARY OF THE INVENTION

Accordingly, it is an object of the present invention to provide an improved transcoder which can take a satellite signal for transmission via satellite in a form for either 256-QAM or 64-QAM channels, and convert it into a cable signal compatible with cable equipment of either capacity.

More generally, it is an object of the invention to permit use of multiple channel capacities and encodings to provide a flexible cable transmission and distribution system without significant investment in new equipment.

These and other objects are achieved in accordance with the present invention by providing an apparatus and method for using the forward error correction setting to enable simultaneous use of modulation systems of different terrestrial distribution networks. The coding rate in the transmitting end is set so that the data rate at the transmitting end matches that at the receiving end. If the receiving data rate is not as great than that being transmitted, then a match may be achieved by providing a demultiplexer at the receiver to generate a separate data stream, which can be used to create additional channels for either 64-QAM or 256-QAM cable transmission, thus using more or all of the transmitted data rate.

In a preferred embodiment, the system includes a transcoder located in a receiving earth station for transcoding a signal received via satellite to produce a cable signal suitable for distribution using 64-QAM cable transmission. The transcoder comprises a satellite demodulator for demodulating such satellite signal, a satellite-FEC decoder for decoding the demodulated signal to generate an FEC-decoded signal with an adjustable coding rate to accommodate multiple data rates, a demultiplexer for demultiplexing the FEC-decoded signal into a main data stream with a bit rate suitable for 64-QAM cable transmission and an auxiliary data stream with a bit rate approximately half that of the main data stream, a cable-FEC encoder for encoding the main data stream to generate an FEC-encoded cable signal, and a cable modulator for modulating the FEC-encoded cable encoded signal into a cable signal suitable for 64-QAM cable transmission.

The system further includes a satellite transmitter, located in a transmitting earth station, for modulating an information signal containing cable television programs into a satellite signal for transmission via satellite. The satellite transmitter comprises a satellite-FEC encoder for encoding such information signal to produce an FEC-encoded signal for transmission via satellite, with an adjustable coding rate for accommodating different data rates, a switch for switching the coding rate of the encoder between a first coding rate corresponding to a data stream for 64-QAM cable transmission and a second coding rate corresponding to a data stream for 256-QAM cable transmission, and a satellite modulator for modulating the FEC-encoded signal to produce a modulated signal for transmission via satellite to the cable headend.

Note that the particular channel capacities and encodings are intended as exemplary; other capacities and encodings are intended to be within the scope of the invention wherein multiple encodings are sent to the cable headend for use by different capacity decoders.

BRIEF DESCRIPTION OF THE DRAWINGS

The objects, features and advantages of the present invention will be more readily apparent from the following detailed description of preferred embodiment of the invention in which.

DETAILED DESCRIPTION OF THE INVENTION

Figure 1:
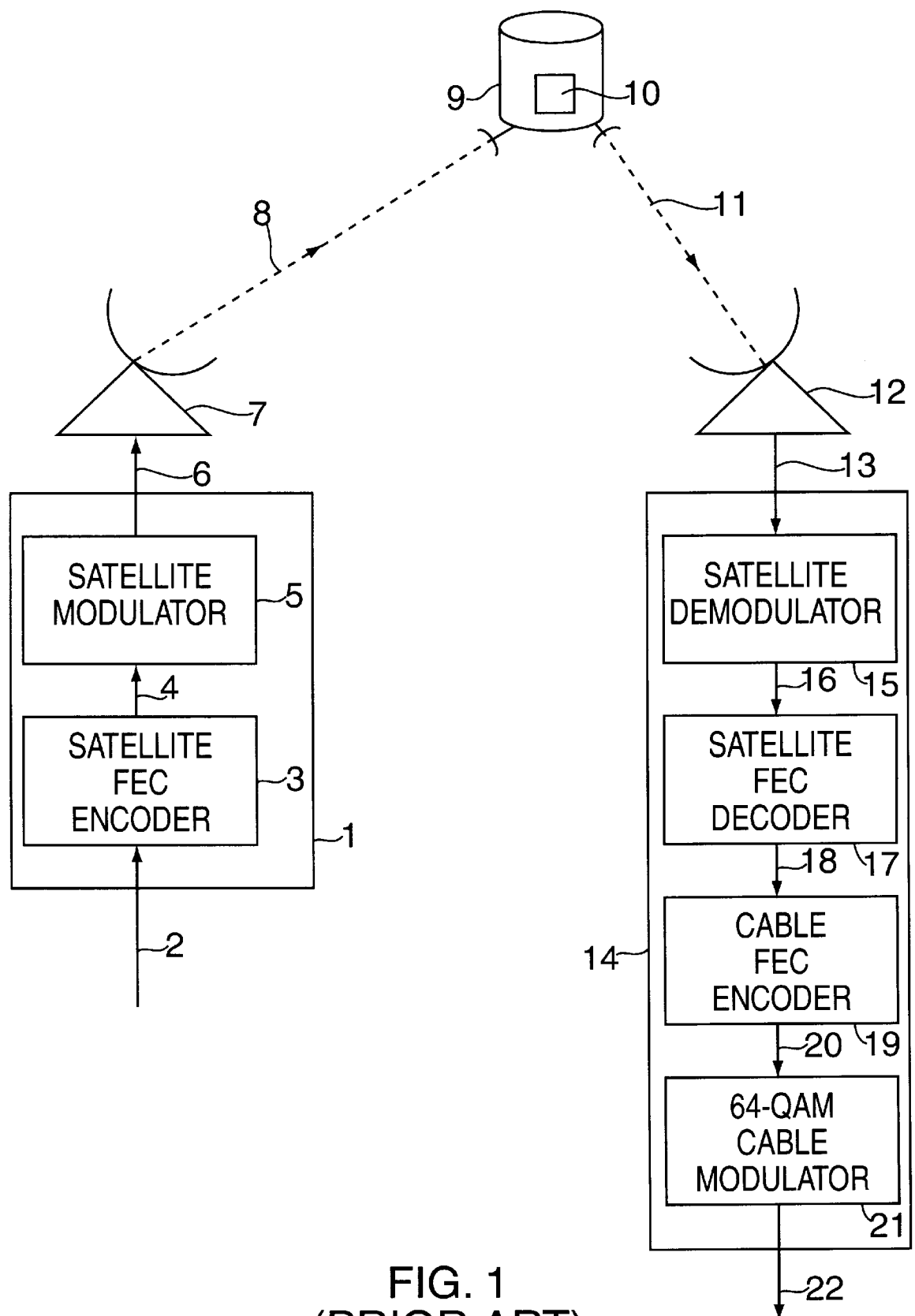
FIG. 1 is a block diagram of a prior art digital cable television broadcasting system using transmission via satellite.
Figure 2:
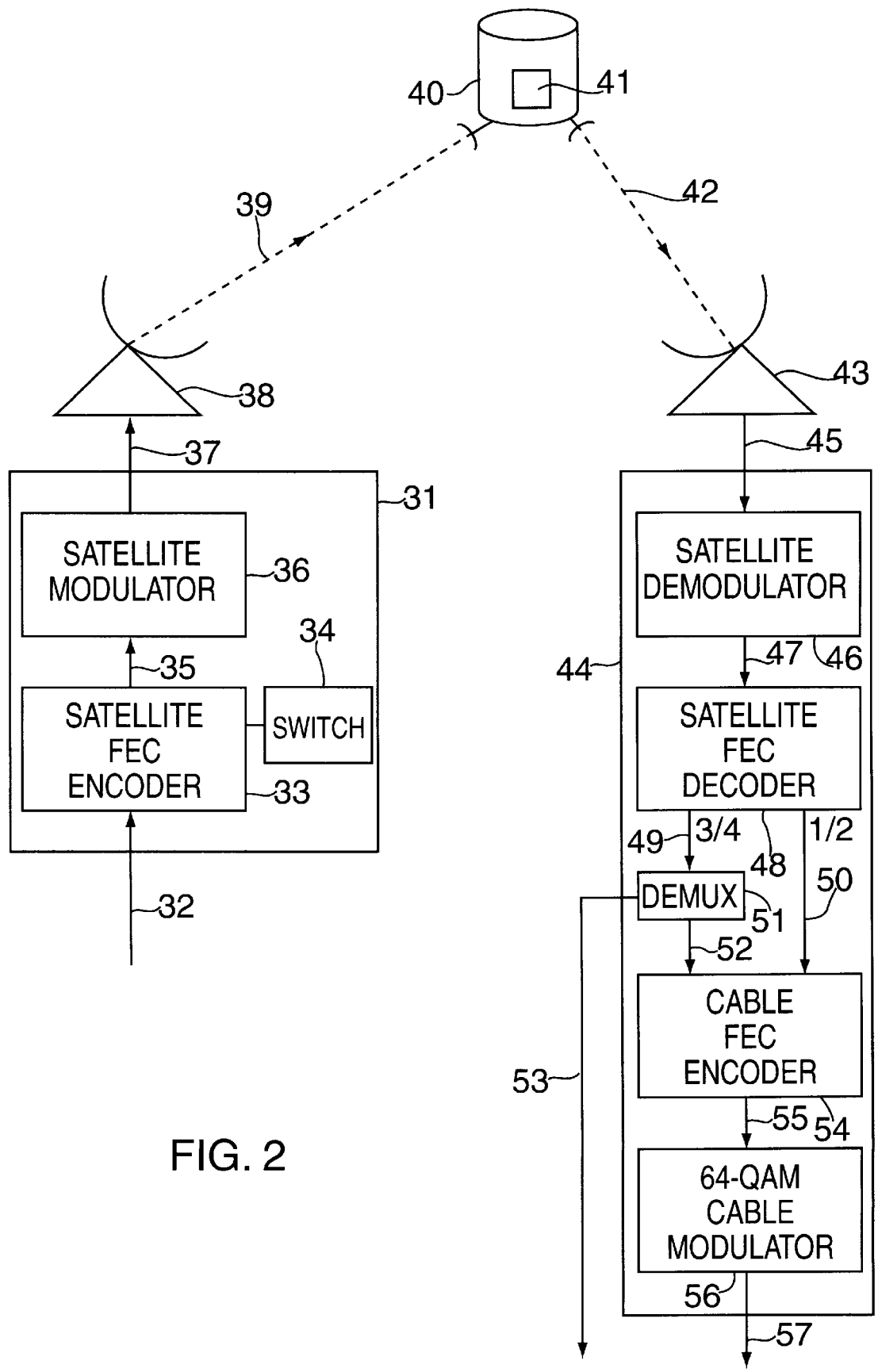
FIG. 2 is a block diagram of a digital cable television broadcasting system using transmission via satellite according to the present invention.

FIG. 2 shows a preferred embodiment of a digital cable broadcasting system using a satellite transmitter and a receiver according to the present invention. Its component parts are described in the following paragraphs.

A. Satellite Transmitter

FIG. 2 shows in the left side a transmitting earth station comprising a satellite transmitter 31 and a transmitting antenna 38. The satellite transmitter 31 includes a satellite-FEC encoder 33, a switch 34 connected to the encoder, and a satellite modulator 36 connected to modulate the output of the encoder for satellite transmission. In the earth station, information signal 32 containing cable programs is fed to satellite-FEC encoder 33, which encodes the signal 32 to generate an FEC-encoded signal 35. The FEC-encoded signal 35 is then QPSK-modulated by the satellite modulator 36 to generate a transmitting satellite signal 37 for transmission via satellite using an antenna 38 in an uplink signal 39. Any other modulation schemes, such as binary phase-shift keying (BPSK), can also be used.

In the preferred embodiment, the satellite-FEC encoder 33 has two levels or shells of error correction: convolution coding as a inner shell for correcting bit errors and Reed Solomon (RS) coding as an outer shell for correcting byte errors. The satellite-FEC encoder takes a block of k input bits and encodes them to n output bits, where (n-k) bits are overheads in terms of redundant bits. The fraction k/n is referred as its coding rate, which serves an indication of coding efficiency. There are two coding rates in the preferred embodiment: a convolution coding rate for convolution coding and a RS coding rate for RS coding.

The transmitter has a switch 34 which can set the convolution coding rate of the satellite-FEC encoder, thus providing multiple data rates. The purpose of varying the coding rate is to match the transmitter and receiver with the satellite link performance so that the receiver can get all the information bits correctly. The satellite link performance is described in terms of a bit-error rate (BER) which depends on a number of factors such as ionospheric effect and atmospheric effects due to clouds, rain, fog, etc. Typically, the BER in the received signal must be lower than $10^{-11}$ for a good picture quality.

The usable bit rates are determined from the coding rates. If the switch 34 is set to provide a convolution coding rate of ½, the usable bit rate would be 25.8 Mbps, which is almost the 27 Mbps suitable for 64-QAM cable transmission. If the convolution coding rate is set to ¾, the usable information bit rate increases to 38.8 Mbps, suitable for 256-QAM cable transmission.

The usable bit rates are calculated as follows. The number of symbols that can be carried for a channel with a given bandwidth depends on a number of factors. However, the ratio of the available bandwidth to the number of symbols that can be carried is generally known to be about 1.2 after consideration of all practical factors. Thus a satellite channel with a 36-Mhz bandwidth can carry approximately 28.1 mega-symbols per second. Since QPSK carries two bits per symbol (as mentioned before), the satellite channel can carry 28.1×2=56.2 Mbps. After convolution coding with a convolution coding rate of ¾, the data rate will be 56.2×¾=42.2 Mbps. After Reed Solomon coding with an RS coding rate of $^{188}/_{204}$, the usable bit rate become 42.2×($^{188}/_{204}$)=38.8 Mbps. Similarly, with a convolution coding rate of ½, the usable bit rate becomes 25.8 Mbps.

Thus, by switching the satellite-FEC encoder 33 between the ½ rate and the ¾ rate, the usable information bit rate through the same modulated satellite carrier can be changed between 25.8 Mbps and 38.8 Mbps, suitable respectively for full 64-QAM and full 256-QAM cable transmission using a 6-Mhz cable slot. The switch 34 can be operated by either hardware or software as will be apparent to those skilled in the art.

Therefore, if the cable operator has not upgraded its equipment to 256 QAM, the cable program suppliers can use the satellite transmitter to transmit cable programs in a form that can be received by the 64-QAM equipment.

Although the preferred embodiment is based on 6-Mhz cable slots available in the United States, the invention is applicable in the same manner to different cable channel bandwidths such as the 8-Mhz cable slots available in Europe.

A satellite 40 has a transponder 41 which receives the uplink signal 39 from the transmitting earth station, amplifies and shifts it to a downlink frequency for retransmission to a receiving earth station in a downlink signal 42. A typical satellite has 24 transponders, each supporting a bandwidth of 27 or 36 Mhz.

B. Transcoder

FIG. 2 also shows in the right side a preferred embodiment of a transcoder 44 according to the present invention. As mentioned in the background section, transcoders generally are well-known in the art of cable television broadcasting using transmission via satellite. Transcoder 44 is an improvement over prior art transcoders.

A receiving satellite signal 42 enters a satellite demodulator 46 where the satellite signal is demodulated to signal 47. The demodulated signal 47 is decoded by a satellite-FEC decoder 48, which removes the redundant FEC codes added for transmission via satellite.

The satellite-FEC decoder 48 can adjust its FEC convolution coding rate to accommodate signals transmitted by the satellite transmitter using different coding rates. If the demodulated signal 47 contains a data stream designed for a 64-QAM cable channel, a convolution coding rate of ½ is selected to generate the FEC-decoded signal 50, which contains 25.8 Mbps of usable data. The coding rate can be selected either manually or automatically by detecting the coding rate from the received signal. Thus, if the cable program supplier broadcasts it in a form suitable for 64-QAM cable transmission, the cable operator can use the transcoder without upgrading its equipment from 64-QAM to 256-QAM and use the same satellite feed as before.

Alternatively, if the demodulated signal 47 contains a data stream designed for a 256-QAM cable channel, a convolution coding rate of ¾ is selected to generate the FEC-decoded signal 49, which thus contains 38.8 Mbps of usable data.

The FEC-decoded signal 49 is then demultiplexed by a demultiplexer 51 into a main data stream 52 with 25.8 Mbps, a bit rate suitable for 64-QAM cable transmission, and an auxiliary data stream 53 with 12.9 Mbps or a bit rate approximately half that of the main data stream.

The main data stream 52 is encoded by a cable-FEC encoder 54 into an FEC-encoded signal 55. A 64-QAM cable modulator 56 modulates the encoded signal 55 to a cable signal 57 for cable distribution.

Figure 3:
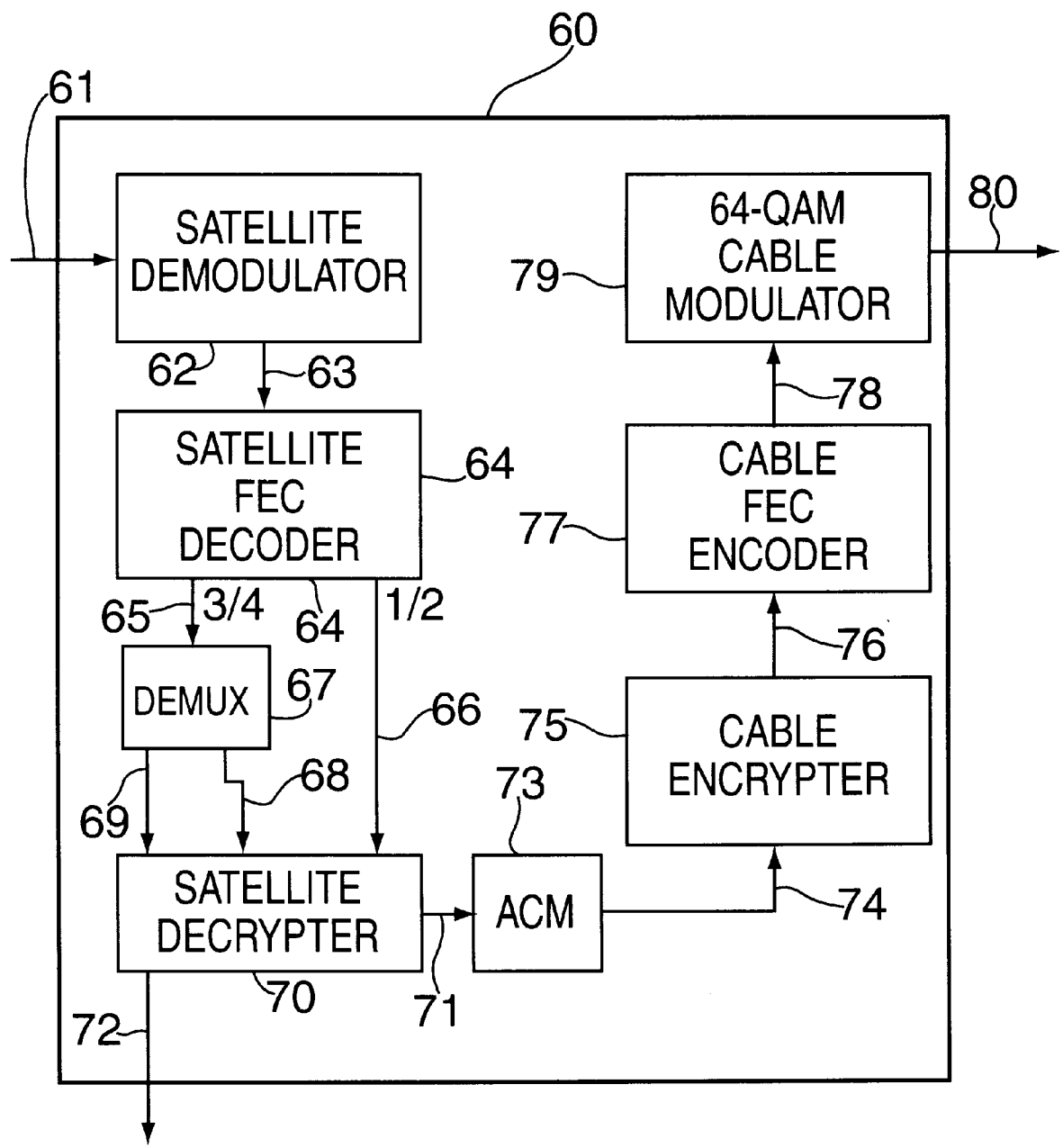
FIG. 3 is a block diagram of an alternative embodiment of the invention using a transcoder located in the receiving earth station.

FIG. 3 shows an alternative embodiment of a transcoder located in the receiving earth station. The satellite signal for transmission via satellite may be further encrypted to prevent unauthorized access. In such a case, the transcoder may further include a satellite decrypter 70 which decrypts or unscrambles the satellite signal after demodulation and FEC-decoding. The transcoder may further include a cable encrypter 75 for encrypting or scrambling the cable information signal before it is FEC-encoded by cable-FEC encoder 77 and modulated by a 64-QAM cable modulator 79 for cable transmission. Typically, access control processing is controlled by commands in a control message stream. In such a case, an access control module 73 may be provided to interpret, generate, or modify such command such that cable operators can control access not only to complete program services but also to individual programs, as in pay-per-view.

C. Multiple Transcoder Configurations

Multiple transcoders can be combined to make use of the 12.9 Mbps auxiliary data streams available in a variety of configurations supporting extra cable channels in either 64-QAM or 256-QAM.

Figure 4:
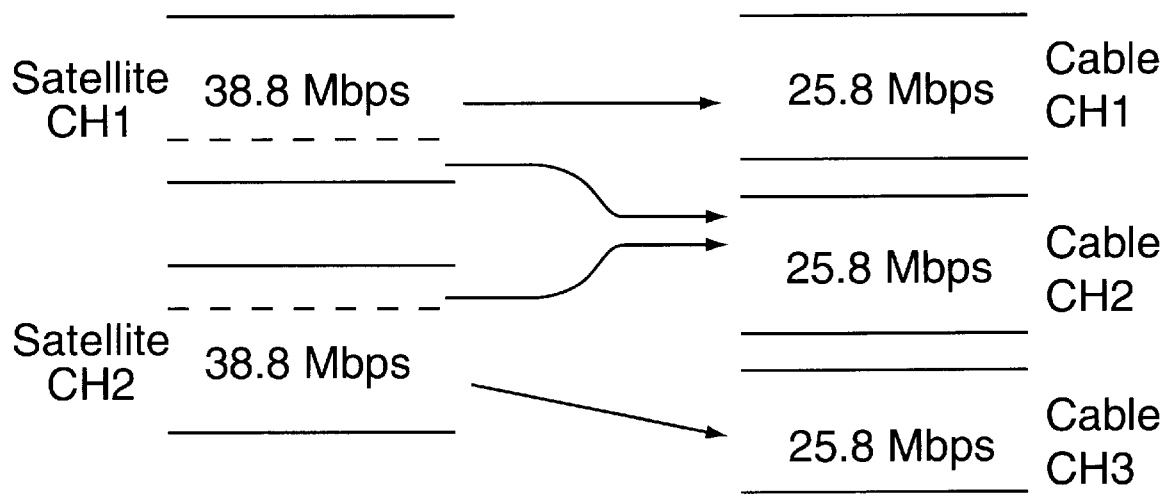
FIG. 4 is a configuration of apparatus in accordance with the invention for combining two received satellite channels to produce three 64-QAM cable channels in the receiving earth station.

FIG. 4 illustrates a configuration for generating three 64-QAM cable channels from two satellite channels. Two transcoders can be used to generate two 25.8-Mbps data streams for two 64-QAM cable channels, each from a satellite channel containing a 38.8 Mbps data stream. Two 12.9-Mbps auxiliary data streams separately generated from the two transcoders are combined by a summing device such as a multiplexer to a third 25.8 Mbps data stream suitable for a third 64-QAM cable channel. Thus, in case a cable operator decides not to upgrade the equipment to 256 QAM, this configuration enables the operator to continue to use its existing 64-QAM equipment with the additional benefit of being able to receive the third cable channel.

Figure 5:
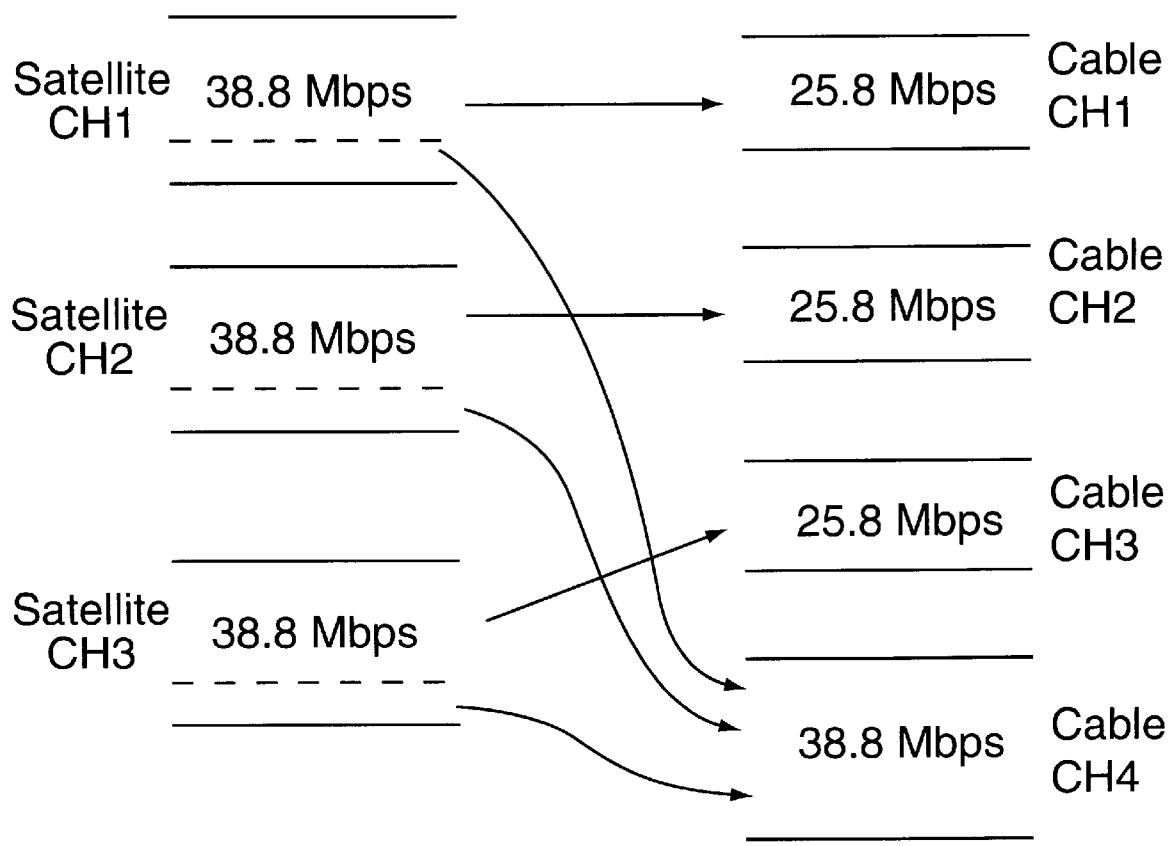
FIG. 5 is a configuration of apparatus in accordance with the invention for combining three satellite channels received to produce three 64-QAM cable channels and one 256-QAM cable channel in the receiving earth station.

FIG. 5 illustrates another configuration for generating three 64-QAM cable channels and one 256-QAM cable channel from three satellite channels. Three transcoders can be used to generate three 25.8-Mbps main data streams for three 64-QAM cable channels from the satellite channels. Three 25.8 main data streams are obtained, each from each satellite channel containing a 38.8-Mbps data stream. Three 12.9-Mbps auxiliary data streams generated separately by the three transcoders are combined by a summing device to generate a fourth data stream of 38.8 Mbps suitable for an extra 256-QAM cable channel.

The above configurations are just examples of many configurations that will be apparent to those skilled in the art based on the above description. Note that the summing device can be a simple fixed-bit rate multiplexer, a well-known device in the art.

While the invention has been described with reference to preferred embodiments, it is not limited to those embodiments. It will be appreciated by those of ordinary skill in the art that modifications can be made to the structure and form of the invention without departing from its spirit and scope which is limited only in accordance with the following claims.

For example, the invention can be used to provide a seamless connection between any two information carrying "pipes", each having equipment supporting different data rates. By changing the coding rate of the first information pipe, its data rate can be made to match that of the second pipe. If the data rate of the second information pipe is less than that of the second pipe, a demultiplexer is provided in the second pipe to siphon off the extra data stream so that it can be used to feed additional information pipes.

What is claimed is:

1. A system for receiving a satellite signal containing a higher bit-rate cable signal and using the satellite signal to provide cable programming through equipment adapted to a lower bit-rate cable signal, comprising:

means for receiving a first satellite signal having the higher bit rate into a first main data stream and a first auxiliary data stream where the first main data stream is used as a first cable channel with the lower bit rate;

means for receiving a second satellite signal having the higher bit rate into a second main data stream and a second auxiliary data stream where the second main data stream is used as a second cable channel with the lower bit rate; and means for combining the first and second auxiliary data streams to generate a third cable signal with the lower bit rate.

2. The system of claim 1 wherein the lower bit rate is a bit rate suitable for 64-QAM transmission.

3. The system of claim 1 wherein the higher bit rate is a bit rate suitable for 256-QAM transmission.

4. A system for receiving a satellite signal containing a higher bit-rate cable signal and using the satellite signal to provide cable programming through equipment adapted to a lower bit-rate cable signal, comprising:

means for receiving a first satellite signal having the higher bit rate into a first main data stream and a first auxiliary data stream where the first main data stream is used as a first cable channel with the lower bit rate;

means for receiving a second satellite signal having the higher bit rate into a second main data stream and a second auxiliary data stream where the second main data stream is used as a second cable channel with the lower bit rate;

means for receiving a third satellite signal having the higher bit rate into a third main data stream and a third auxiliary data stream where the third main data stream is used as a third cable channel with the lower bit rate; and means for combining the first, second, and third auxiliary data streams to generate a cable signal with the higher bit rate.

5. A method of receiving a satellite signal containing a higher bit-rate cable signal and using the satellite signal to provide cable programming through equipment adapted to a lower bit-rate cable signal, comprising the steps of:

receiving a first satellite signal having the higher bit rate into a first main data stream and a first auxiliary data stream where the first main data stream is used as a first cable channel with the lower bit rate;

receiving a second satellite signal having the higher bit rate into a second main data stream and a second auxiliary data stream where the second main data stream is used as a second cable channel with the lower bit rate; and combining the first and second auxiliary data streams to generate a third cable signal with the lower bit rate.

6. The method of claim 5 wherein the lower bit rate is a bit rate suitable for 64-QAM transmission.

7. The method of claim 5 wherein the higher bit rate is a bit rate suitable for 256-QAM transmission.

8. A method of receiving a satellite signal containing a higher bit-rate cable signal and using the satellite signal to provide cable programming through equipment adapted to a lower bit-rate cable signal, comprising the steps of:

receiving a first satellite signal having the higher bit rate into a first main data stream and a first auxiliary data stream where the first main data stream is used as a first cable channel with the lower bit rate;

receiving a second satellite signal having the higher bit rate into a second main data stream and a second auxiliary data stream where the second main data stream is used as a second cable channel with the lower bit rate;

receiving a third satellite signal having the higher bit rate into a third main data stream and a third auxiliary data stream where the third main data stream is used as a third cable channel with the lower bit rate; and combining the first, second, and third auxiliary data streams to generate a cable signal with the higher bit rate.

* * * * *